United States Patent
Smith et al.

(10) Patent No.: US 11,284,555 B2
(45) Date of Patent: Mar. 29, 2022

(54) SYSTEM AND METHOD FOR MONITORING THE LEVELNESS OF AN AGRICULTURAL IMPLEMENT

(71) Applicant: CNH Industrial Canada, Ltd., Saskatoon (CA)

(72) Inventors: Kevin M. Smith, Narvon, PA (US); James W. Henry, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 328 days.

(21) Appl. No.: 16/674,766

(22) Filed: Nov. 5, 2019

(65) Prior Publication Data

US 2021/0127547 A1 May 6, 2021

(51) Int. Cl.
*A01B 63/28* (2006.01)
*G01C 9/00* (2006.01)
*A01B 49/02* (2006.01)
*G01C 7/04* (2006.01)
*A01B 21/08* (2006.01)

(52) U.S. Cl.
CPC ............... *A01B 63/28* (2013.01); *G01C 9/00* (2013.01); *A01B 21/08* (2013.01); *A01B 49/027* (2013.01); *G01C 7/04* (2013.01)

(58) Field of Classification Search
USPC .......................................................... 172/1
See application file for complete search history.

(56) References Cited

U.S. PATENT DOCUMENTS

| | | |
|---|---|---|
| 3,749,035 A | 7/1973 | Cayton et al. |
| 4,454,919 A | 6/1984 | Arnold et al. |
| 7,958,709 B2 | 6/2011 | Coleman et al. |
| 8,326,500 B2 | 12/2012 | Mariman et al. |
| 8,408,149 B2 | 4/2013 | Rylander |
| 8,573,319 B1 | 11/2013 | Casper et al. |
| 9,485,900 B2 | 11/2016 | Connell et al. |

(Continued)

FOREIGN PATENT DOCUMENTS

| | | |
|---|---|---|
| WO | WO2015048867 | 4/2015 |
| WO | WO2018020310 | 2/2018 |

OTHER PUBLICATIONS

Early Riser, 2000 Series Planter, CASE IH Productivity Guide, Mar. 9, 2017 (56 pages) https://www.centralilag.com/fckimages/literature-showroom/2000-Planter-Productivity-Guide.pdf.

*Primary Examiner* — Paul D Lee
(74) *Attorney, Agent, or Firm* — Rebecca L. Henkel; Rickard K. DeMille (57) ABSTRACT

A system for monitoring the levelness of an agricultural implement may include first and second tools rotatably supported on the agricultural implement, with the first and second tools being spaced apart from each other in at least one of a longitudinal direction or a lateral direction of the agricultural implement. The system may further include a first rotational speed sensor configured to detect a rotational speed of the first tool and a second rotational speed sensor configured to detect a rotational speed of the second tool. Additionally, the system may include a controller communicatively coupled to the first and second rotational speed sensors, with the controller being configured to identify a levelness state of at least a portion of the agricultural implement based at least in part on the rotational speeds of the first and second tools.

20 Claims, 6 Drawing Sheets

(56) References Cited

U.S. PATENT DOCUMENTS

| | | |
|---|---|---|
| 9,554,504 B2 | 1/2017 | Houck |
| 9,861,022 B2 | 1/2018 | Bassett |
| 9,943,027 B2 | 4/2018 | Sauder et al. |
| 9,961,823 B2 | 5/2018 | Sporrer et al. |
| 9,986,674 B2 | 6/2018 | Sudbrink et al. |
| 10,254,773 B2 * | 4/2019 | Winzenz ................ B64D 31/12 |
| 2016/0088787 A1 * | 3/2016 | Connell ................ A01B 76/00 |
| | | 701/50 |
| 2017/0049040 A1 * | 2/2017 | Kinzenbaw ............ A01C 5/068 |
| 2018/0120133 A1 | 5/2018 | Blank et al. |
| 2019/0045703 A1 | 2/2019 | Bassett |

* cited by examiner

SYSTEM AND METHOD FOR MONITORING THE LEVELNESS OF AN AGRICULTURAL IMPLEMENT

FIELD OF THE INVENTION

The present subject matter relates generally to agricultural implements, and more particularly, to systems and methods for monitoring the levelness of an agricultural implement.

BACKGROUND OF THE INVENTION

It is well known that, to attain the best agricultural performance from a field, a farmer must cultivate the soil, typically through a tillage operation. Modern farmers perform tillage operations by pulling a tillage implement behind an agricultural work vehicle, such as a tractor. Tillage implements typically include one or more ground engaging tools configured to engage the soil as the implement is moved across the field. For example, in certain configurations, the implement may include one or more harrow disks, leveling disks, rolling baskets, shanks, tines, and/or the like. Such ground engaging tool(s) loosen and/or otherwise agitate the soil to prepare the field for subsequent planting operations.

During tillage operations, it is important for the implement to be properly leveled such that the tool assemblies evenly engage the ground. When the tool assemblies become out-of-level relative to the ground and/or other tool assemblies, the field may be worked unevenly, which may affect the quality of subsequent agricultural operations within the field. As such, an operator must continuously monitor the performance of the implement during the tillage operation. However, it is often difficult for the operator to visually assess the performance of the implement, which means that the quality of the agricultural operation may be affected for long periods of operation. Further, manually adjusting the levelness of the implement is time consuming and, in some cases, needs to be repeated multiple times throughout a working operation of the implement.

Accordingly, an improved system and related method for monitoring the levelness of an agricultural implement would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for monitoring the levelness of an agricultural implement. The system includes first and second tools rotatably supported on the agricultural implement, where the first and second tools are spaced apart from each other in at least one of a longitudinal direction or a lateral direction of the agricultural implement. The system further includes a first rotational speed sensor configured to detect a rotational speed of the first tool and a second rotational speed sensor configured to detect a rotational speed of the second tool. Additionally, the system includes a controller communicatively coupled to the first and second rotational speed sensors, with the controller being configured to identify a levelness state of at least a portion of the agricultural implement based at least in part on the rotational speeds of the first and second tools.

In another aspect, the present subject matter is directed to a method for monitoring the levelness of an agricultural implement, where the agricultural implement has first and second tools rotatably supported thereon, with the first and second tools being spaced apart from each other in at least one of a longitudinal direction or a lateral direction of the agricultural implement. The method includes receiving, with a computing device, data indicative of a rotational speed of the first tool. The method further includes receiving, with the computing device, data indicative of a rotational speed of the second tool. Moreover, the method includes identifying, with the computing device, a levelness state of at least a portion of the agricultural implement based at least in part on the rotational speeds of the first and second tools. Additionally, the method includes initiating, with the computing device, a control action associated with adjusting a levelness of the at least a portion of the agricultural implement when the levelness state of the at least a portion of the agricultural implement is identified as being out-of-level.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for monitoring the levelness of an agricultural implement having rotating ground engaging tools. Specifically, in several embodiments, the disclosed system may monitor the rotational speeds of two or more of the ground engaging tools as the implement performs an agricultural operation within the field to estimate the levelness of the implement, particularly a portion(s) of the implement on which the monitored ground engaging tools are supported. A difference between the rotational speeds is generally indicative of the monitored ground engaging tools engaging the ground at different depths, which, in turn, occurs as a result of a portion(s) of the implement supporting all or a portion of the tools being out-of-level. For instance, if a rotational speed of a disk of a first disk assembly, such as a first disk gang, is different that a rotational speed of a disk of a second disk assembly, such as a second disk gang, the first and second disk assemblies may be out-of-level relative to each other. Similarly, if a rotational speed of a disk at a first end of a disk assembly is different than a rotational speed of a disk at a second end of the disk assembly, the disk assembly may be out-of-level across the disk assembly.

In several embodiments, a controller of the disclosed system may be configured to determine the levelness of the portion(s) of the implement supporting the monitored tools based at least in part on the monitored rotational speeds of the ground engaging tools. In one embodiment, the controller may compare a speed differential between the rotational speeds of the ground engaging tools to a predetermined differential threshold, with the threshold being selected such that speed differentials exceeding the threshold are generally indicative of a portion of the implement being out-of-level. In some embodiments, the controller may further be configured to automatically initiate a control action to adjust the levelness of the implement based on the determined levelness state. In one embodiment, the control action may include adjusting the operation of one or more actuators of the implement to adjust the levelness of the implement. In some embodiments, the controller may further be configured to perform a secondary control action associated with another, non-levelness-based implement parameter when the perceived levelness state of the portion of the implement does not improve after the first control action is performed.

Figure 1:
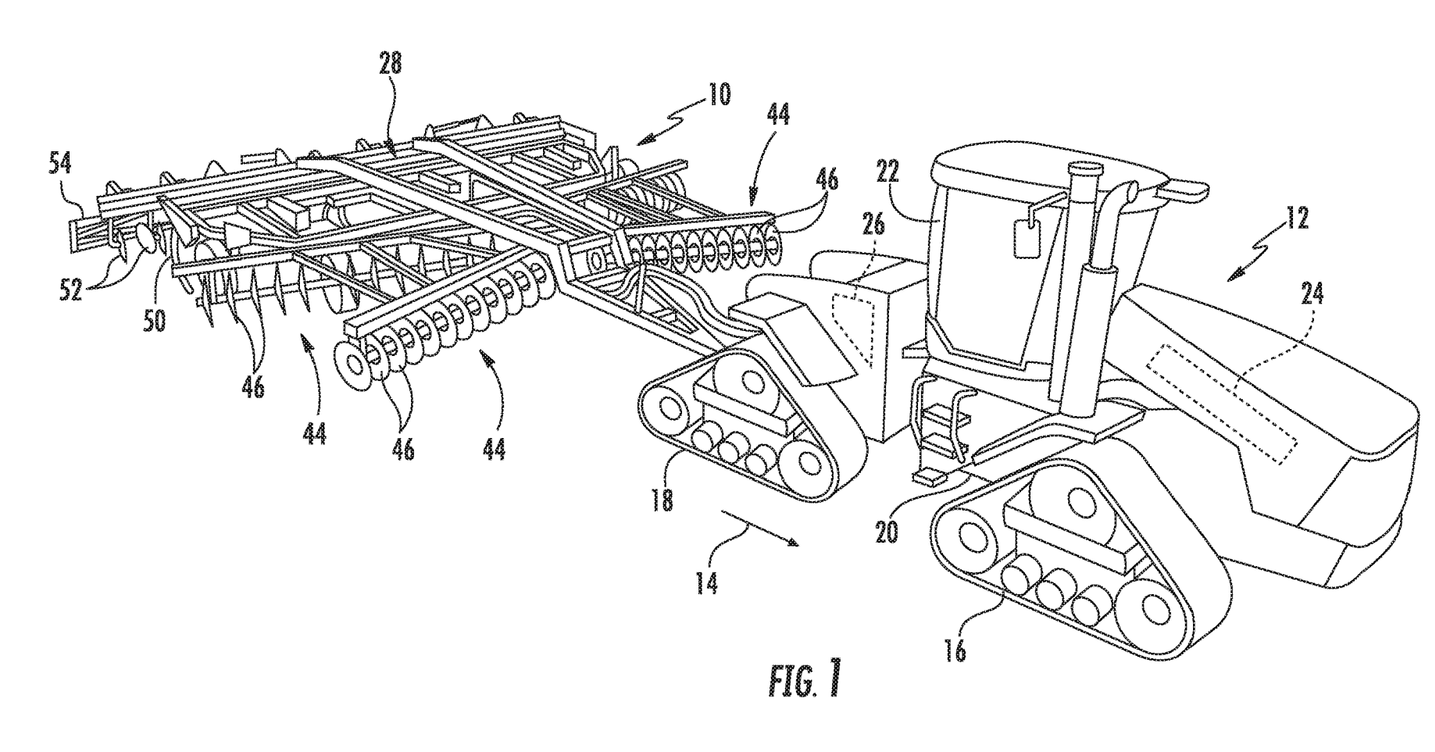
FIG. 1 illustrates a perspective view of one embodiment of an agricultural implement coupled to a work vehicle in accordance with aspects of the present subject matter.
Figure 2:
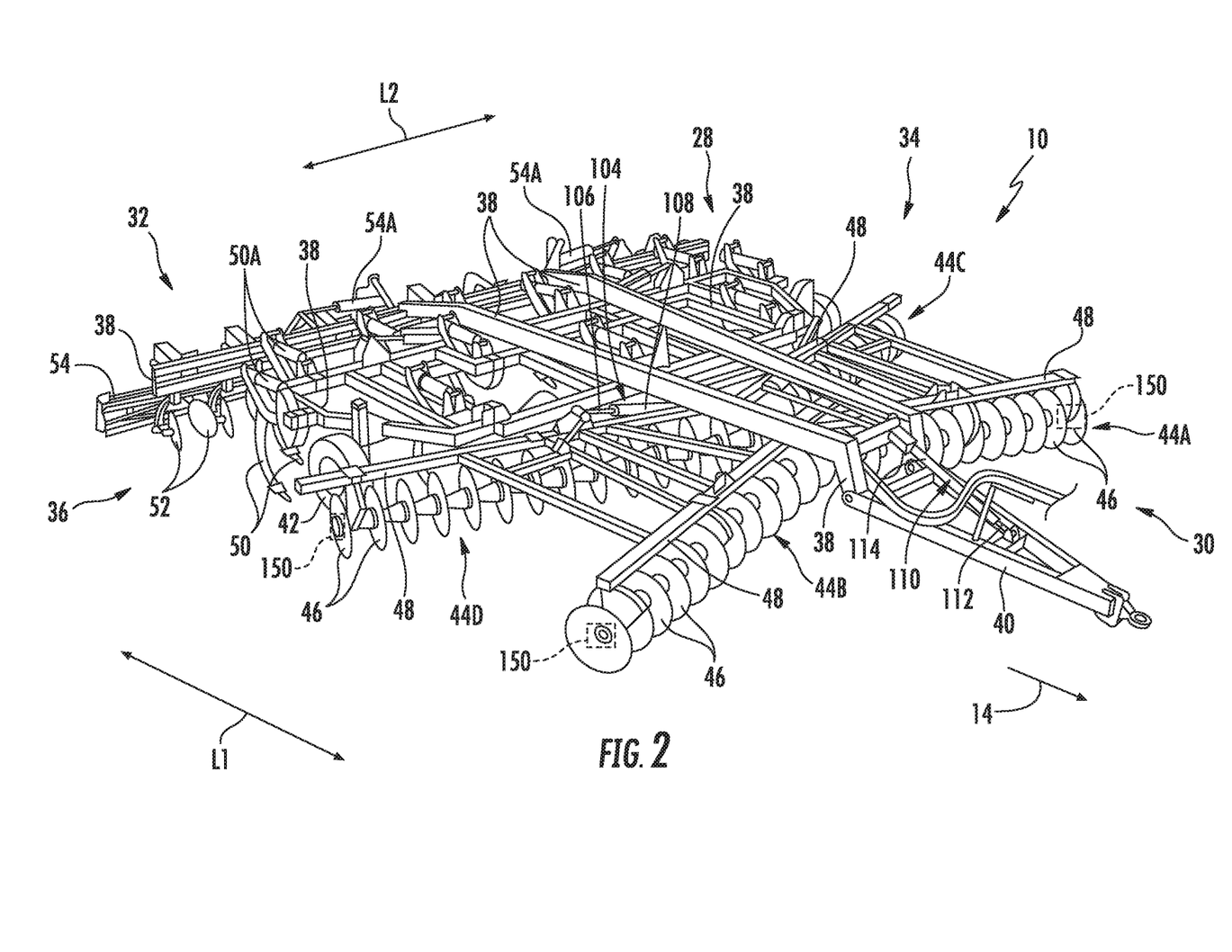
FIG. 2 illustrates an alternative perspective view of an agricultural implement in accordance with aspects of the present subject matter, particularly illustrating rotational speed sensors provided in operative association with various ground engaging assemblies of the implement.

Referring now to the drawings, FIGS. 1 and 2 illustrate differing perspective views of one embodiment of an agricultural implement 10 in accordance with aspects of the present subject matter. Specifically. FIG. 1 illustrates a perspective view of the agricultural implement 10 coupled to a work vehicle 12. Additionally, FIG. 2 illustrates a perspective view of the implement 10, particularly illustrating various components of the implement 10.

In general, the implement 10 may be configured to be towed across a field in a direction of travel (e.g., as indicated by arrow 14 in FIG. 1) by the work vehicle 12. As shown, the implement 10 may be configured as a tillage implement, and the work vehicle 12 may be configured as an agricultural tractor. However, in other embodiments, the implement 10 may be configured as any other suitable type of implement, such as a seed-planting implement, a fertilizer-dispensing implement, and/or the like. Similarly, the work vehicle 12 may be configured as any other suitable type of vehicle, such as an agricultural harvester, a self-propelled sprayer, and/or the like.

As shown in FIG. 1, the work vehicle 12 may include a pair of front track assemblies 16 (only one of which is shown), a pair of rear track assemblies 18 (only one of which is shown), and a frame or chassis 20 coupled to and supported by the track assemblies 16, 18. An operator's cab 22 may be supported by a portion of the chassis 20 and may house various input devices (e.g., a user interface 260 shown in FIG. 11) for permitting an operator to control the operation of one or more components of the work vehicle 12 and/or one or more components of the implement 10. Additionally, the work vehicle 12 may include an engine 24 and a transmission 26 mounted on the chassis 20. The transmission 26 may be operably coupled to the engine 24 and may provide variably adjusted gear ratios for transferring engine power to the track assemblies 16, 18 via a drive axle assembly (not shown) (or via axles if multiple drive axles are employed).

As shown in FIGS. 1 and 2, the implement 10 may include a frame 28. More specifically, as shown in FIG. 2, the frame 28 may extend along a longitudinal direction L1 between a forward end 30 and an aft end 32. The frame 28 may also extend along a lateral direction L2 between a first side 34 and a second side 36. In this respect, the frame 28 generally includes a plurality of structural frame members 38, such as beams, bars, and/or the like, configured to support or couple to a plurality of components. Furthermore, a hitch assembly 40 may be connected to the frame 28 and configured to couple the implement 10 to the work vehicle 12. Additionally, a plurality of wheels 42 (one is shown) may be coupled to the frame 28 to facilitate towing the implement 10 in the direction of travel 14.

In several embodiments, the frame 28 may be configured to support one or more gangs or sets 44 of disk blades 46, such as first and second front disk gangs 44A, 44B and first and second rear disk gangs 44C, 44D. Each disk blade 46 may, in turn, be configured to penetrate or otherwise engage the soil as the implement 10 is being pulled through the field. In this regard, the various disk gangs 44 may be oriented at an angle relative to the direction of travel 14 to promote more effective tilling of the soil. It should be appreciated that, while the implement 10 is shown as including four disk gangs 44, the implement 10 may include any other suitable number of disk gangs 44, such as more or fewer than four disk gangs 44. Furthermore, in one embodiment, the disk gangs 44 may be mounted to the frame 28 at any other suitable location, such as adjacent to its aft end 32.

Moreover, in several embodiments, the implement 10 may include a plurality of disk gang actuators 104 (only one of which is shown in FIG. 2), with each actuator 104 being configured to move or otherwise adjust the orientation or position of at least one of the disk gangs 44 relative to the implement frame 28. For example, as shown in the illustrated embodiment, a first end of the disk gang actuator 104 (e.g., a rod 106 of the actuator 104) may be coupled to a support arm or toolbar 48 of at least one corresponding disk gang 44, while a second end of the actuator 104 (e.g., a cylinder 108 of the actuator 104) may be coupled to the frame 28. The rod 106 of the actuator 104 may be configured to extend or retract relative to the corresponding cylinder 108 to adjust the angle of the corresponding disk gang(s) 44 relative to a lateral centerline (not shown) of the frame 28 and/or the penetration depth of the associated disk blades 46. The actuator 104 may correspond to a fluid-driven actuator, such as a hydraulic or pneumatic cylinder. However, it should be appreciated that the actuator 104 may correspond to any other suitable type of actuator, such as an electric linear actuator.

Further, in several embodiments, the implement 10 may include at least one fore-to-aft actuator 110 configured to move or otherwise adjust the fore-to-aft levelness of the implement 10. For example, as shown in the illustrated embodiment, a first end of the fore-to-aft actuator 110 (e.g., a rod 112 of the actuator 110) may be coupled to the hitch assembly 40, while a second end of the fore-to-aft actuator 110 (e.g., a cylinder 114 of the actuator 110) may be coupled to the frame 28. The rod 112 of the actuator 110 may be configured to extend or retract relative to the corresponding cylinder 114 to adjust the fore-to-aft levelness of the implement 10. Similar to the disk gang actuator 104, the fore-to-aft actuator 110 may be configured as any suitable actuator, such as a fluid-driven actuator (e.g., a hydraulic or pneumatic cylinder), an electric linear actuator, a screw-drive actuator, and/or the like.

Moreover, as shown, in one embodiment, the implement frame 28 may be configured to support other ground engaging tools. For instance, in the illustrated embodiment, the frame 28 is configured to support a plurality of shanks 50 or tines (not shown) configured to rip or otherwise till the soil as the implement 10 is towed across the field. Furthermore, in the illustrated embodiment, the frame 28 is also configured to support a plurality of leveling blades 52 and rolling (or crumbler) basket assemblies 54. The implement 10 may further include shank frame actuator(s) 50A and/or basket assembly actuator(s) 54A configured to move or otherwise adjust the orientation or position of the shanks 50 and the basket assemblies 54, respectively, relative to the implement frame 28. It should be appreciated that, in other embodiments, any other suitable ground-engaging tools may be coupled to and supported by the implement frame 28, such as a plurality closing disks.

In accordance with aspects of the present subject matter, two or more sensors, such as two or more rotational speed sensors 150, may be provided in operative association with the implement 10 for detecting data indicative of the rotational speeds of at least two rotating, ground engaging tools of the implement 10. For instance, FIG. 2 illustrates examples of various locations for mounting rotational speed sensors 150 for detecting data indicative of the rotational speeds of rotating, ground engaging tools of the implement 10. Particularly, in the illustrated embodiment, a first rotational speed sensor 150 is associated with the first front disk gang 44A extending laterally to the first side 34 of the implement 10, adjacent to the forward end 30 of the implement 10. Similarly, a second rotational speed sensor 150 is associated with the second front disk gang 44B extending laterally to the second side 36 of the implement 10, adjacent to the forward end 30 of the implement 10. Further, a third rotational speed sensor 150 is associated with the second rear disk gang 44D extending laterally to the second side 36 of the implement 10, rearward of the second front disk gang 44B.

In one embodiment, each rotational speed sensor 150 is configured to directly detect the rotational speed of one of the disk blades 46 of the associated disk gang 44. In other embodiments, the rotational speed sensors 150 may be configured to indirectly detect the rotational speeds of the associated disk blades 46, such as by detecting the rotational speed of a disk gang shaft coupled to each disk blade 46 of the corresponding disk gang 44 to allow the rotational speed of the associated disk blades 46 to be monitored. It should be appreciated that the rotational speed sensors 150 may be configured as any suitable sensing devices configured to detect or capture data indicative of the rotational speed of the rotating tools and may be positioned at any suitable location on the implement 10 to detect such rotational speed.

In accordance with aspects of the present subject matter, the rotational speed sensors 150 may be configured to detect data indicative of the rotational speed of disk blades 46 of the respective disk gangs 44, which may then be used to determine the levelness state of the implement 10, particularly the levelness state of the portion of the implement 10 (e.g., the toolbars 48) carrying the respective disk gangs 44. For instance, the first and second rotational speed sensors 150 are associated with the front disk gangs 44A, 44B, which are spaced apart along the lateral direction L2 of the implement 10. As such, the rotational speeds of the disk blades 46 of the different disk gangs 44A, 44B detected by the first and second rotational speed sensors 150 may be compared to determine the lateral levelness of the implement 10, particularly the levelness state of the toolbars 48 supporting the front disk gangs 44A, 44B in the lateral direction L2 of the implement 10. Similarly, the second and third rotational speed sensors 150 are associated with the front and rear disk gangs 44B, 44D located along the second side 36 of the implement 10, which are spaced apart along the longitudinal direction L1 of the implement 10. As such, the rotational speeds of such disk gangs 44B, 44D, as detected by the second and third rotational speed sensors 150, may be compared to determine the fore-to-aft levelness of the implement 10, particularly the fore-to-aft levelness of the toolbars 48 supporting such disk gangs 44B, 44D.

It should be appreciated that the configuration of the implement 10 and work vehicle 12 described above are provided only to place the present subject matter in an exemplary field of use. Thus, it should be appreciated that the present subject matter may be readily adaptable to any manner of implement or work vehicle configurations. For instance, it should be appreciated that, while the rotational speed sensors 150 have been generally described with reference to detecting the rotational speed of disk blades 46 of different disk gangs 44 of a tillage implement 10, the rotational speed sensors 150 may be configured to be associated with any other rotating ground engaging tools or ground engaging assemblies of any suitable implement which are spaced apart from each other in at least one of a longitudinal direction L1 or a lateral direction L2 of the implement.

Figure 3:
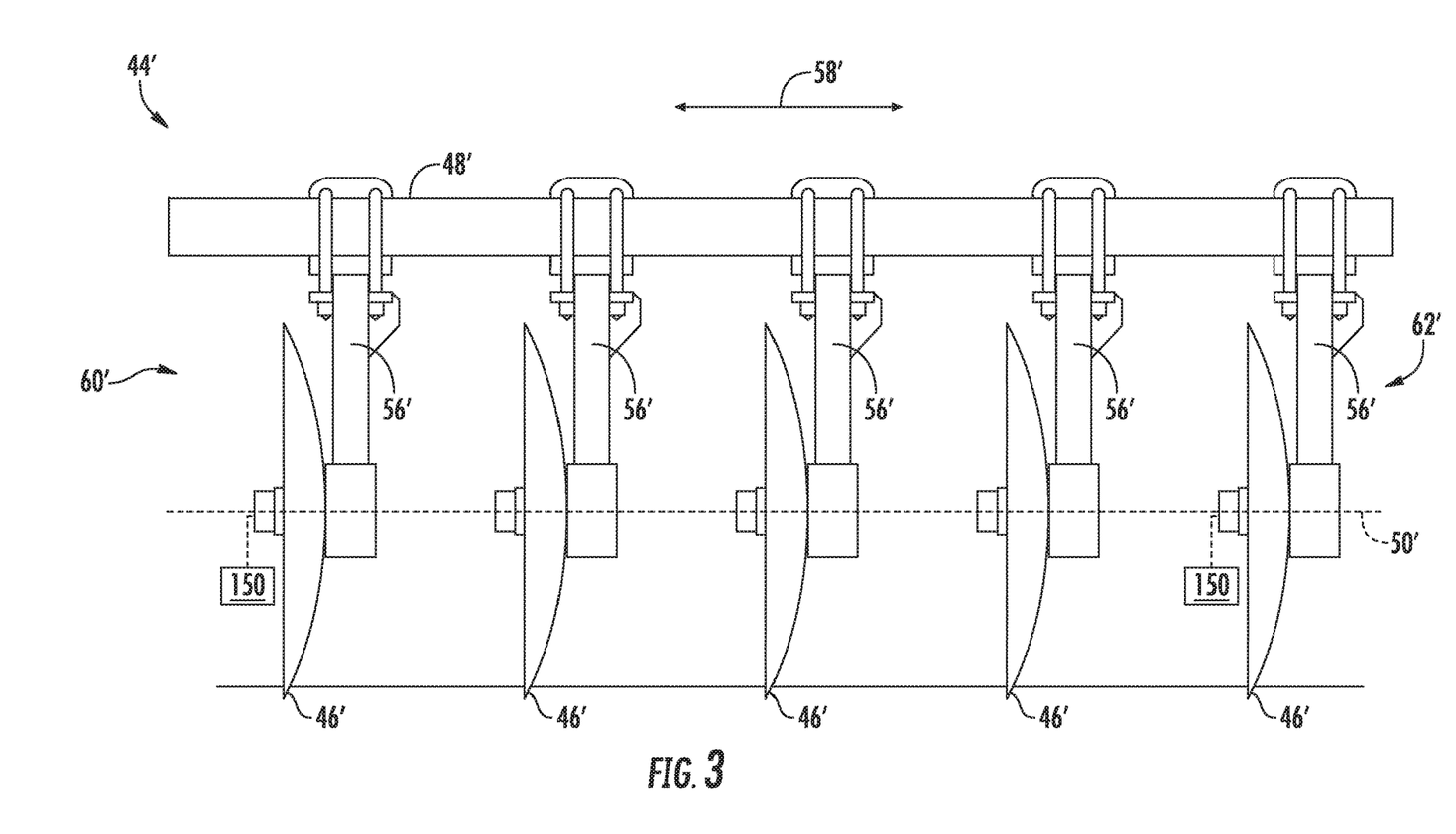
FIG. 3 illustrates a front view of a disk assembly of an agricultural implement in accordance with aspects of the present subject matter, particularly illustrating rotational speed sensors provided in operative association with a disk assembly of the implement.

Referring now to FIG. 3, an alternative embodiment of a disk assembly with which the above-described rotational speed sensors 150 may be used is illustrated in accordance with aspects of the present subject matter. In the illustrated embodiment, the rotational speed sensors 150 are shown as being provided in operative association with a disk assembly 44', which is configured substantially similar to one of the disk gangs 44 described above with reference to FIGS. 1-2, except that disk blades 46' of the disk assembly 44' are individually mounted on a support arm or toolbar 48' by respective hangers 56'. The toolbar 48' extends along an axial direction of the disk assembly 44' (e.g., as indicated by arrow 58') between a first end 60' and a second end 62', with the axial direction 58' extending at least partially in both the longitudinal and lateral directions L1, L2 (FIG. 2) of the implement 10. However, in other embodiments, the toolbar 48' may extend completely in the lateral direction L2 of the implement 10.

As shown in FIG. 3, the disk blades 46' are spaced apart along the axial direction 58' and are rotatable about a rotational axis 50'. In such embodiment, the rotational speed sensors 150 may be used to determine a levelness state of the disk assembly 44', particularly the levelness state of the toolbar 48', along the axial direction 58'. More particularly, at least two rotational speed sensors 150 may be used to monitor the rotational speed of at least two of the disk blades 46' of the disk assembly 44' to determine the levelness state of the disk assembly 44'. For example, as shown in FIG. 3, a first rotational speed sensor 150 may be configured to detect the rotational speed of the disk blade 46' positioned closest to the first end 60' of the disk assembly 44' and a second rotational speed sensor 150 may be configured to detect the rotational speed of the disk blade 46' positioned closest to the second end 62' of the disk assembly 44'. In such embodiment, the difference between the rotational speeds of the different disk blades 46' of the disk assembly 44' detected by the rotational speed sensors 150 may generally be indicative of the levelness state of the disk assembly 44' along the axial direction 58', with a smaller difference being associated with a more level disk assembly 44'.

It should be appreciated that the rotational speed sensors 150 described herein may be configured to measure the rotational speed of any suitable disk blades 46, 46' that are spaced apart from each other in the longitudinal and/or lateral direction(s) L1, L2 of the implement. For instance, the rotational speed sensors 150 may be configured to monitor any disk blades 46' that are not directly adjacent to each other to determine the levelness state of the associated disk assembly(ies) 44, 44' and/or toolbar(s) 48, 48'. Further, the rotational speed of any suitable number of disk blades 46, 46" may be monitored to determine the levelness state of the implement 10. For example, the rotational speed of three or more disk blades 46, 46' may be monitored to determine the levelness state of the associated disk assembly(ies) 44, 44' and/or toolbar(s) 48, 48'.

Figure 4:
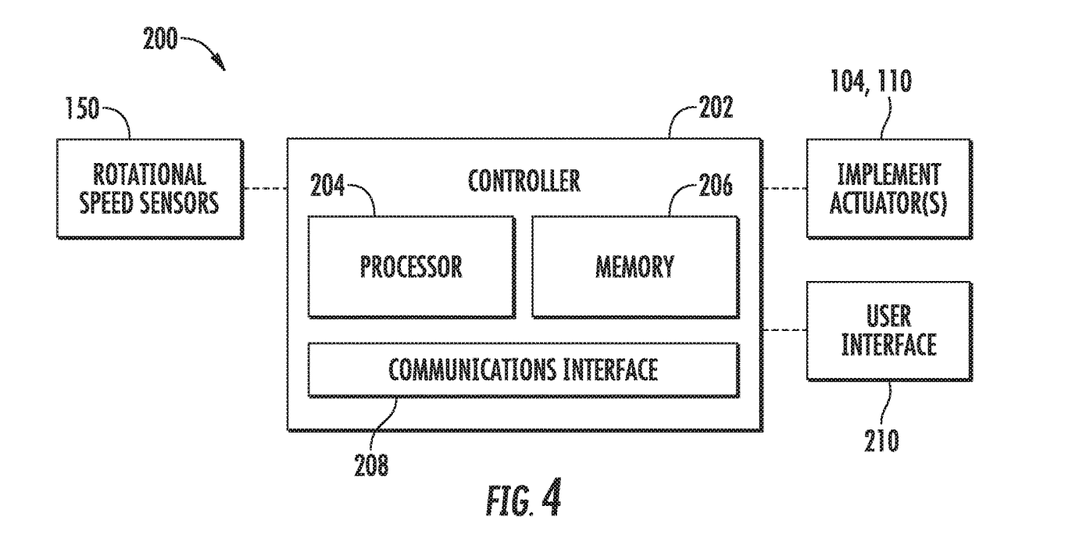
FIG. 4 illustrates a schematic view of one embodiment of a system for monitoring the levelness of an agricultural implement in accordance with aspects of the present subject matter.

Referring now to FIG. 4, a schematic view of one embodiment of a system 200 for monitoring the levelness of an agricultural implement is illustrated in accordance with aspects of the present subject matter. As will be described below, the system 200 allows for the levelness state of an implement (or portions thereof) to be monitored based on a detected differential of the rotational speeds of ground-engaging tools of an implement. In addition, the system 200 allows for one or more portions of an implement to be actuated to adjust the levelness of the implement. For purposes of discussion, the system 200 will generally be described herein with reference to the implement 10 and work vehicle 12 described above and shown in FIGS. 1 and 2, as well as the disk assembly 44, 44' configurations shown in FIGS. 1-3. However, it should be appreciated that the disclosed system 200 may generally be utilized with any suitable implement having any suitable implement configuration (including any suitable disk assembly configuration) and/or with any suitable work vehicle having any suitable vehicle configuration. Additionally, it should be appreciated that communicative links or electrical couplings of the system 200 shown in FIG. 4 are indicated by dashed lines.

As shown, the system 200 includes a controller 202 configured to electronically control the operation of one or more components of the agricultural implement 10. In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

It should be appreciated that, in several embodiments, the controller 202 may correspond to an existing controller of the agricultural implement 10 and/or of the work vehicle 12 to which the implement 10 is coupled. However, it should be appreciated that, in other embodiments, the controller 202 may instead correspond to a separate processing device. For instance, in one embodiment, the controller 202 may form all or part of a separate plug-in module that may be installed within the agricultural implement 10 to allow for the disclosed system and method to be implemented without requiring additional software to be uploaded onto existing control devices of the agricultural implement 10.

In some embodiments, the controller 202 may include a communications module or interface 208 to allow for the controller 202 to communicate with any of the various other system components described herein. For instance, as described above, the controller 202 may, in several embodiments, be configured to receive data inputs from one or more sensors of the agricultural implement 10 that are used to detect one or more parameters associated with the levelness of the implement 10. Particularly, the controller 202 may be in communication with sensors configured to detect one or more parameters associated with or indicative of the levelness of the implement 10. For instance, the controller 202 may be communicatively coupled to the rotational speed sensors 150 via any suitable connection, such as a wired or wireless connection, to allow data indicative of the levelness state of the implement 10 to be transmitted from the sensors 150 to the controller 202.

Specifically, referring back to FIGS. 1-3, the system 200, may include or be associated with the rotational speed sensors 150 installed or otherwise positioned relative to the implement 10 to capture data (e.g., rotational speed data) indicative of the rotational speeds of the respective disk blades 46, 46', which, in turn, is indicative of the levelness state of at least the portion of the implement 10 supporting such respective disk blades (e.g., toolbar(s) 48, 48'). Thus, in several embodiments, the controller 202 may be configured to monitor the levelness state of at least a portion of the implement 10 based on the data received from the sensors 150. For example, the controller 202 may be configured to analyze/process the received data to monitor the levelness of the disk assemblies 44, 44' relative to each other and/or the levelness of one of the disk assemblies 44' based at least in part on the data received from the sensors 150. For instance, the controller 202 may include one or more suitable algorithms stored within its memory 206 that, when executed by the processor 204, allow the controller 202 to infer or estimate the levelness state of the implement 10 based at least in part on the data received from the sensors 150.

For instance, when the monitored disk blades 46, 46' engage the ground at different penetration depths, a differential will exist between the rotational speeds of such disk blades 46, 46'. Accordingly, in one embodiment, the controller 202 may include one or more algorithms that compare the detected speed differential between the rotational speeds of the monitored disk blades 46, 46' to one or more predetermined thresholds selected to be indicator of the levelness of the portion of the implement 10 supporting the monitored disk blades 46, 46'. For example, the controller 202 may compare the speed differential between the rotational speeds of the monitored disk blades 46, 46' to at least one predetermined threshold corresponding to the maximum speed differential at which it is expected that the associated portion(s) of the implement 10 (e.g., the toolbar(s) 48, 48') will be in a level state. If the differential is equal to or below the predetermined threshold, the controller 202 can determine or infer that the associated portion(s) of the implement 10 is in a level state. However, if the differential exceeds the predetermined threshold, the controller 202 can determine or infer that the associated portion(s) of the implement 10 is out-of-level. For instance, once it is determined that the differential exceeds the predetermined threshold, the controller 202 may compare the rotational speed(s) of the associated portion(s) of the implement 10 to historical rotational speed(s) of the associated portion(s) and determine that the associated portion(s) is out-of-level when the rotational speed(s) of the associated portion(s) differs from the historical rotational speed(s) by a predetermined amount. Alternatively, the controller 202 may compare the rotational speed(s) of the associated portion(s) of the implement 10 to historical rotational speed(s) of the associated portion(s) without first comparing the speed differential between the rotational speeds of the monitored portions, e.g., disk blades 46, 46', to at least one predetermined threshold.

Additionally, in several embodiments, the controller 202 may be configured to perform one or more implement-related control actions based on the data received from the sensors 150. Specifically, the controller 202 may be configured to control one or more actuators of the agricultural implement 10 based on the estimated or inferred levelness state of the various disk assemblies 44, 44' relative to each other and/or the levelness of an individual disk assembly 44', as described above with reference to FIGS. 1-3, to adjust levelness of the implement 10. For example, as shown in FIG. 4, the controller 202 may be configured to control one or more actuators associated with the implement 10, such as the disk gang actuator(s) 104 and/or the fore-to-aft actuator 110, to level the toolbar(s) 48, 48' associated with any out-of-level disk assembly(ies) 46, 46'. Additionally or alternatively, the controller 202 may be configured to control one or more wheel actuators (not shown) associated with one or more of the wheels 42 of the implement to level the toolbar(s) 48, 48' associated with any out-of-level disk assembly(ies) 46, 46'.

Further, in some embodiments, the controller 202 may be configured to indicate to an operator the levelness state of the implement 10. For example, in the embodiment shown in FIG. 4, the communications module 208 may allow the controller 202 to communicate with a user interface 210 having a display device configured to display information regarding the levelness state of the implement 10 and/or suggested control actions. For instance, the controller 202 may control the operation of the user interface 210 to display the sensor data or data associated with the sensor data to the operator. For example, the controller 202 may control the operation of the user interface 210 to display data associated with the levelness state of the disk assembly(ies) 44, 44', such as the differential between the rotational speeds of the monitored ground engaging tools 46, 46' and/or relative positioning of different disk assemblies 44, 44' determined therefrom. However, it should be appreciated that the controller 202 may instead be communicatively coupled to any number of other indicators, such as lights, alarms, and/or the like to provide an indicator to the operator regarding the levelness state of the implement 10 and/or suggested control actions.

In addition, in some embodiments, the user interface 210 may include one or more input devices (not shown), such as touchscreens, keypads, touchpads, knobs, buttons, sliders, switches, mice, microphones, and/or the like, which are configured to receive user inputs from the operator. In some embodiments, the controller 202 may further be configured to receive one or more user inputs from the operator via the user interface 210, including inputs associated with the levelness of the implement 10. For example, the controller 202 may receive inputs instructing the controller 202 to execute one or more control actions to adjust the levelness of the implement 10. In one embodiment, the user interface 210 may be positioned within a cab (not shown) of the vehicle 12. However, in alternative embodiments, the user interface 210 may have any suitable configuration and/or be positioned in any other suitable location.

Figure 5:
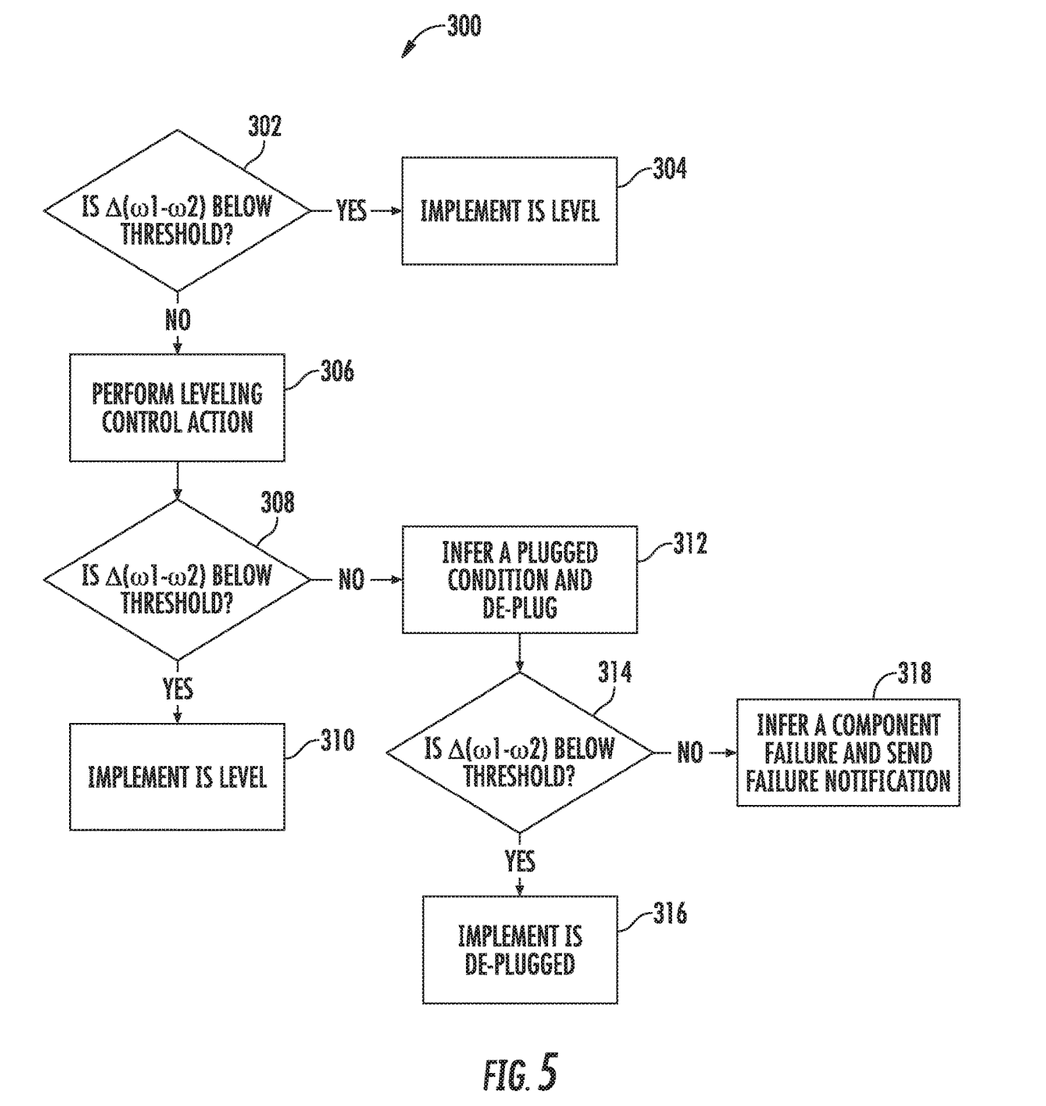
FIG. 5 illustrates a flow diagram of one embodiment of a control algorithm for monitoring the levelness of the agricultural implement in accordance with aspects of the present subject matter.

Referring now to FIG. 5, a flow diagram of one embodiment of a control algorithm 300 that may be executed when monitoring the levelness of an agricultural implement is illustrated in accordance with aspects of the present subject matter. In general, the control algorithm 300 will be described herein as being implemented by the controller 202 of the system 200 described above with reference to FIG. 4. However, it should be appreciated that the various processes described below may alternatively be implemented by another computing device or any combination of computing devices. In addition, although FIG. 5 depicts control steps or functions performed in a particular order for purposes of illustration, the management routines discussed herein are not limited to any particular order or arrangement. One skilled in the art, using the disclosures provided herein, will appreciate that the various steps or functions of the algorithms disclosed herein can be omitted, rearranged, combined, and/or adapted in various ways without deviating from the scope of the present disclosure.

As shown in FIG. 5, during the performance of an agricultural operation, such as a tillage operation, the controller 202 may be configured to estimate or identify whether at least a portion of the implement 10 is experiencing problems attributed to the levelness of the implement based on the monitored rotational speeds of the associated ground-engaging tools of the implement 10. For example, as shown at (302), the controller 202 may be configured to assess whether the speed differential between the rotational speeds of first and second rotating ground-engaging tools is below a predetermined threshold. In the event that the speed differential between the rotational speeds of the first and second tools is below the predetermined threshold, the controller 202 may, at (304), infer or determine that the portion(s) of the implement 10 supporting such tools is level. In the event that the speed differential between the rotational speeds of the first and second tools is above the predetermined threshold, the controller 202 may, at (306), infer or determine that the portion(s) of the implement 10 supporting such tools is out-of-level and initiate a control action associated with adjusting the levelness state of the portion(s) of the implement 10. For instance, as described above with reference to FIG. 4, the controller 202 may control an operation of one or more actuators of the implement 10, such as the actuators 104, 110, to adjust the levelness state of at least a portion of the implement 10, such as the toolbar(s) 48, 48'.

Further, as shown in FIG. 5, after performing the control action, at (306), the controller 202 may, at (308), again monitor the rotational speeds of the first and second tools and determine whether the speed differential between such rotational speeds has dropped below the predetermined threshold. In the event that the updated speed differential between the updated rotational speeds of the first and second tools is below the predetermined threshold, the controller 202 may, at (310), infer or determined that the portion(s) of the implement 10 supporting the first and second tools is now level. However, in the event that the updated speed differential between the rotational speeds of the first and second tools is still above the predetermined threshold, the controller 202 may infer or determine that the implement 10 is experiencing an issue associated with another, non-levelness-based implement parameter and initiate a secondary control action associated with adjusting such other implement parameter. For example, the controller may, at (312), infer that a portion of the implement 10 is experiencing a plugged condition when the updated speed differential is above the predetermined threshold, and initiate a secondary control action associated with de-plugging the tools of such portion of the implement 10.

During normal, non-plugged operation of the disk assemblies 44, 44', substantially all of the field materials being processed by the disk assemblies 44, 44' flow through the open spaces defined between adjacent disk blades 46, 46' of the disk assemblies 44, 44'. However, during a plugged condition, field materials may accumulate between the adjacent disk blades 46, 46' such that the disk blades 46, 46' may have more resistance against rotation. As such, the monitored disk blades 46, 46' rotate at different speeds due to material accumulation formed relative to the respective disk assembly(ies) 44, 44'. In some embodiments, the controller 202 may be configured to perform an automatic de-plugging operation upon determination of a plugged condition. For instance, in one embodiment, the de-plugging operation may include increasing or decreasing the force on the disk gang actuator(s) 104 on the disk assembly(ies) 44, 44'. However, in some embodiments, the controller 202 may instead be configured to generate a notification for the operator of the implement 10 indicative of the plugged condition for the operator to manually remove the material accumulation.

As shown in FIG. 5, in addition to inferring a plugged condition or as an alternative thereto, the controller may, at (318), infer or determine that the implement 10 is experiencing a component failure. In one embodiment, such components may include one or more support components associated with the levelness of the implement 10 (e.g., actuators 104, 110 becoming out of phase, bearings (not shown) breaking, etc.). In such embodiments, the controller 202 may be configured to generate a notification for the operator indicative of a potential component failure.

By performing the above-described algorithm 300, multiple operating parameters may be automatically assessed to improve the operation of the implement 10 before an operator must manually check the implement 10, which significantly improves the time associated with adjusting the implement 10 during an agricultural operation.

Figure 6:
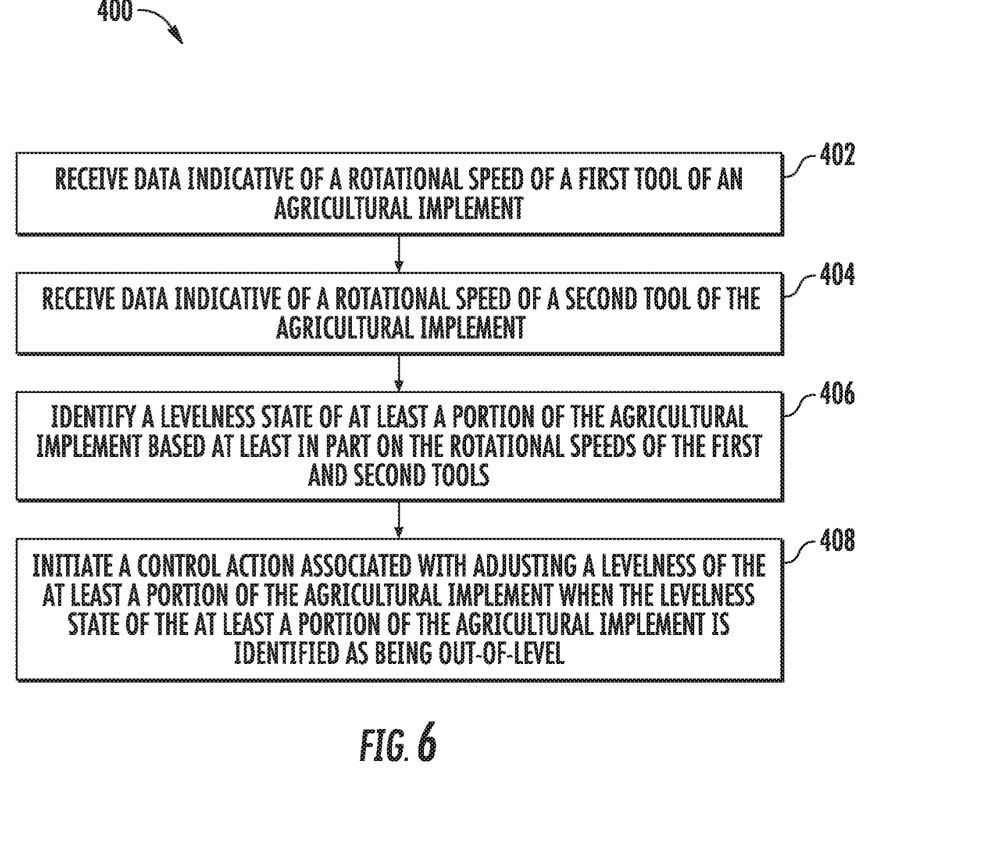
FIG. 6 illustrates a flow diagram of one embodiment of a method for monitoring the levelness of an agricultural implement in accordance with aspects of the present subject matter.

Referring now to FIG. 6, a flow diagram of one embodiment of a method 400 for monitoring the levelness of an agricultural implement is illustrated in accordance with aspects of the present subject matter. In general, the method 400 will be described herein with reference to the implement 10 shown in FIGS. 1-4, as well as the system 200 shown in FIG. 5. However, it should be appreciated that the disclosed method 400 may be executed with implements having any other suitable configurations and/or with systems having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined and/or adapted in various ways without deviating from the scope of the present disclosure.

As shown in FIG. 6, at (402), the method 400 may include receiving data indicative of a rotational speed of a first tool of an agricultural implement. For instance, as indicated above, the controller 202 may receive an input indicative of a rotational speed of a first disk blade 46, 46' of a disk assembly 44, 44' of the implement 10, such as by receiving an input from an associated rotational speed sensor 150.

Further, at (404), the method 400 may include receiving data indicative of a rotational speed of a second tool of the agricultural implement. For instance, as indicated above, the controller 202 may receive an input indicative of a rotational speed of a second disk blade 46, 46' of another disk assembly 44, 44' and/or of a second disk blade 46' of the same disk assembly 44', such as by receiving an input from an associated rotational speed sensor 150.

Moreover, at (406), the method 400 may include identifying a levelness state of at least a portion of the agricultural implement based at least in part on the rotational speeds of the first and second tools. For instance, as described above, the controller 202 may compare the rotational speeds of two or more disk blades 46, 46' and determine the levelness state of the associated disk assembly(ies) 44, 44'. For example, when two monitored disk blades 46, 46' are associated with two different assemblies 44, 44', the controller 202 may determine that the two different assemblies 44, 44' are out-of-level relative to each other when a differential between the rotational speeds of the monitored disk blades 46, 46' exceeds a threshold differential. Similarly, when the monitored disk blades 46' are associated with a single disk assembly 44', the controller 202 may determine that the disk assembly 44' is out-of-level when a differential between the rotational speeds of the monitored disk blades 46' exceeds the threshold differential.

Additionally, at (408), the method 400 may include initiating a control action associated with adjusting a levelness of the at least a portion of the agricultural implement when the levelness state of the at least a portion of the agricultural implement is identified as being out-of-level. For instance, as indicated above, in one embodiment, the controller 202 may be configured to control the operation of one or more actuators 104, 110 of the implement 10 to adjust the levelness of the portion of the agricultural implement that is identified as being out-of-level. In some embodiments, the controller 202 may indicate to an operator the levelness state of the implement 10, e.g., by controlling the operation of the user interface 210 to display information relating to the levelness state of the implement 10.

It is to be understood that the steps of the routine 300 and method 400 are performed by the controller 202 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 202 described herein, such as the routine 300 and method 400, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the routine 300 and method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for monitoring the levelness of an agricultural implement, the system comprising:
    first and second tools rotatably supported on the agricultural implement, the first and second tools being spaced apart from each other in at least one of a longitudinal direction or a lateral direction of the agricultural implement;
    a first rotational speed sensor configured to detect a rotational speed of the first tool;
    a second rotational speed sensor configured to detect a rotational speed of the second tool; and
    a controller communicatively coupled to the first and second rotational speed sensors, the controller being configured to identify a levelness state of at least a portion of the agricultural implement based at least in part on the rotational speeds of the first and second tools.

2. The system of claim 1, wherein the controller is configured to determine a speed differential between the rotational speeds of the first and second tools and identify the levelness state of the at least a portion of the agricultural implement based at least in part on the speed differential.

3. The system of claim 2, wherein the controller is configured to compare the speed differential to a predetermined speed differential threshold and identify the levelness state of the at least a portion of the agricultural implement as being out-of-level when the speed differential exceeds the predetermined differential threshold.

4. The system of claim 1, wherein the controller is configured to initiate a control action associated with adjusting a levelness of the at least a portion of the agricultural implement when the levelness state of the at least a portion of the agricultural implement is identified as being out-of-level.

5. The system of claim 4, wherein the control action comprises controlling an operation of an actuator provided in operative association with the agricultural implement to adjust the levelness of the at least a portion of the agricultural implement.

6. The system of claim 4, wherein the controller is configured to determine updated rotational speeds for the first and second tools following execution of the control action and initiate a secondary control action associated with another implement parameter when an analysis of the updated rotational speeds otherwise indicates that the at least a portion of the agricultural implement is still out-of-level.

7. The system of claim 1, wherein the first tool is supported on a first toolbar of the agricultural implement and the second tool is supported on a second toolbar of the agricultural implement, the controller being configured to determine that the first and second toolbars are out-of-level relative to each other based at least in part on the rotational speeds of the first and second tools.

8. The system of claim 7, wherein the first toolbar is spaced apart from the second toolbar along the longitudinal direction of the agricultural implement.

9. The system of claim 7, wherein the first toolbar is spaced apart from the second toolbar along the lateral direction of the implement.

10. The system of claim 7, wherein the first tool is one of a first plurality of ganged disks of a first disk gang assembly, and the second tool is one of a second plurality of ganged disks of a second disk gang assembly.

11. The system of claim 1, wherein the first and second tools are supported on a toolbar of the agricultural implement, the controller being configured to determine that the toolbar is out-of-level based at least in part on the rotational speeds of the first and second tools.

12. A method for monitoring the levelness of an agricultural implement, the agricultural implement including first and second tools rotatably supported thereon, the first and second tools being spaced apart from each other in at least one of a longitudinal direction or a lateral direction of the agricultural implement, the method comprising:
    receiving, with a computing device, data indicative of a rotational speed of the first tool;
    receiving, with the computing device, data indicative of a rotational speed of the second tool;

identifying, with the computing device, a levelness state of at least a portion of the agricultural implement based at least in part on the rotational speeds of the first and second tools; and initiating, with the computing device, a control action associated with adjusting a levelness of the at least a portion of the agricultural implement when the levelness state of the at least a portion of the agricultural implement is identified as being out-of-level.

13. The method of claim 12, further comprising:

determining a speed differential between the rotational speeds of the first and second tools; and comparing the speed differential to a predetermined differential threshold.

14. The method of claim 13, wherein identifying the levelness state of at least a portion of the agricultural implement comprises identifying the at least a portion of the agricultural implement as being out-of-level when the speed differential exceeds the predetermined differential threshold.

15. The method of claim 12, further comprising:

determining, with the computing device, updated rotational speeds of the first and second tools following execution of the control action; and initiating, with the computing device, a secondary control action associated with another implement parameter when an analysis of the updated rotational speeds otherwise indicates that the at least a portion of the agricultural implement is still out-of-level.

16. The method of claim 12, wherein the first tool is supported on a first toolbar of the agricultural implement and the second tool is supported on a second toolbar of the agricultural implement, wherein initiating the control action comprises adjusting a levelness of at least one of the first tool bar or the second toolbar when it is identified that the first and second toolbars are out-of-level relative to each other.

17. The method of claim 16, wherein the first toolbar is spaced apart from the second toolbar along the longitudinal direction of the agricultural implement.

18. The method of claim 16, wherein the first toolbar is spaced apart from the second toolbar along the lateral direction of the implement.

19. The method of claim 12, wherein the first tool is one of a first plurality of ganged disks of a first disk gang assembly and the second tool is one of a second plurality of ganged disks of a second disk gang assembly.

20. The method of claim 12, wherein the first and second tools are supported on a toolbar of the implement, wherein initiating the control action comprises adjusting a levelness of the toolbar when it is identified that the toolbar is out-of-level.

* * * * *